United States Patent [19]

Miyayama et al.

[11] Patent Number: 4,855,739
[45] Date of Patent: Aug. 8, 1989

[54] MARINE AUTOPILOT APPARATUS

[75] Inventors: Toshio Miyayama; Isao Masuzawa, both of Kuroiso; Nakayasu Hirono, Yokohama, all of Japan

[73] Assignee: Tokyo Keike Co., Ltd., Tokyo, Japan

[21] Appl. No.: 74,884

[22] Filed: Jul. 17, 1987

[30] Foreign Application Priority Data

Jul. 28, 1986 [JP] Japan ................................. 61-177375

[51] Int. Cl.$^4$ .............................................. G08B 23/00
[52] U.S. Cl. .................................. 340/984; 114/144 R
[58] Field of Search ............................... 340/984, 987; 114/144 E; 364/443; 73/178 R; 318/565, 588; 244/194, 196

[56] References Cited

U.S. PATENT DOCUMENTS

| 4,038,528 | 7/1977 | Fowler | 340/987 |
| 4,055,135 | 10/1977 | Wesner | 340/987 |
| 4,374,423 | 2/1983 | Kundler et al. | 364/457 X |

FOREIGN PATENT DOCUMENTS 0096510 12/1983 European Pat. Off. .

Primary Examiner—Joseph A. Orsino
Assistant Examiner—Jeffery A. Hofsass
Attorney, Agent, or Firm—Bauer & Schaffer

[57] ABSTRACT

A marine autopilot apparatus having a microcomputer for controlling a rudder control loop formed of at least a rudder servo amplifier, and a power unit, for detecting an abnormality concerning the steering of a rudder and for indicating an alarm concerning the detected abnormality and the like. A representing alarm indicator lamp classifying the abnormalities into a single or plurality of groups and for collectively indicating the abnormalities in the form of the single or plurality of groups. A general-purpose indicator for indicating various data at least concerning the steering, set values and respective contents of the abnormalities detected and a rudder control collective alarm circuit for indicating the occurrence of the abnormality in the rudder control loop. The rudder control collective alarm circuit is driven when at least one of a plurality of alarm points within the rudder control loop, and the power unit exhibits an abnormal condition.

2 Claims, 2 Drawing Sheets

MARINE AUTOPILOT APPARATUS

BACKGROUND OF THE INVENTION

1. Field of the Invention

The present invention relates generally to marine autopilot apparatus and, more particularly, to a marine autopilot apparatus having an alarm system to collectively indicate the occurrence of abnormality relating to the rudder control loop by an independent alarm indicator lamp.

2. Description of the Prior Art

Recently, marine autopilot apparatus has been provided with a microcomputer to fulfill various requirements, such as, to achieve energy-saving steering, to save man power, to increase steering efficiency and so on. In such marine autopilot apparatus, the microcomputer carries out various control functions relating to the automatic steering. Also, the microcomputer performs the processing of various alarm signals such as the detection of an occurrance of abnormality of each alarm point, the recovery from the abnormality, as well as the indication of the alarm point at which the abnormality occurred and so on.

Meanwhile, the latest alarm indication systems have been modified so that:

Since the microcomputer is incorporated into the marine autopilot system, an indication system is provided having an independent alarm indicator lamp exclusively located at each alarm point to individually indicate the situation of the alarms. However, the system is provided with only one general alarm indicator lamp to representationally indicate the presence or absense of an alarm point at which an abnormality occurred. As to the individual indication of alarm points where abnormality occurred, they are individually indicated on a general-purpose indicator which is adapted to indicate various data, values set and so on within the marine autopilot apparatus as a kind of indication data.

FIG. 1 is a block diagram showing an example of this kind of a known alarm system.

Referring to FIG. 1, an alarm point condition signal 10 is shown to indicate a normal condition or abnormal condition by making itself high (H) or low (L) in level or vice versa. The alarm point condition signal 10 contains a rudder control system alarm point condition signal 11 which indicates the normal condition or abnormal condition of a rudder servo amplifier 2, a power unit 60 or the like. The rudder servo amplifier 2 and the power unit 60 are each adapted to control a steering machine 70. The rudder servo amplifier 2 generates a power unit drive signal 61 which is then supplied to the power unit 60, while the power unit 60 generates a follow-up signal 62 which is then supplied to the rudder servo amplifier 2. Thus, the rudder servo amplifier 2 and the power unit 60 constitute a servo loop.

Meanwhile, there is shown a microcomputer 1 which is adapted to detect from the input alarm point condition signal 10 the occurences of abnormality at every alarm point (the change of the signal from the normal condition to the abnormal condition) and the recovery of the abnormal condition to the normal condition (the change of the signal from the abnormal condition to the normal condition) at every alarm point. The microcomputer 1 is adapted if there exists even one abnormal alarm point, to cause the representing alarm indicator lamp 20 to be lit or blinked to indicatre the existence of the abnormal alarm point. Further, if an abnormality newly occurs or it is requested to indicate the abnormal alarm point, the microcomputer 1 causes a general-purpose indicator 30 to indicate the name or the like of the abnormal alarm point. The general-purpose indicator 30 may, in most cases, be an indicator which can indicate English alphabets and numerals of about 10 to 40 letters. Since this type of indicator 30 indicates only one or two alarm points at the same time, if it is necessary to indicate more than two alarm points, the indication must be renewed by a switch or other operation.

FIG. 2 illustrates an example of the representing alarm indicator lamp 20 in which the lamp 20 is formed of an emergency alarm indicator lamp 21 and a warning indicator lamp 22. In this case, when an alarm occurs which requires urgent operations, such as, switching the automatic steering mode of the ship to the mamual steering mode or to the non-follow-up steering mode and so on, the emergency alarm indicator lamp 21 is caused to be lit or blinked. When another alarm is generated, the warning indicator lamp 22 is caused to be lit or blinked. According to the representing alarm indicator lamp 20 of FIG. 2, the generated alarms are classified in accordance with the degree of emergency and then indicated.

However, according to the known marine autopilot apparatus as described above, the abnormality at the alarm point is collectively detected by the microcomputer 1 and the conditions that produce the alarms are indicated solely or in the classied forms corresponding to the emergency degree of several stages of alarms on the representing alarm indicator lamp 20. Also, the content of the individual alarm is sequentially indicated on the general-purpose indicator 30 at every one or two points by the name of alarm or the like. Accordingly, when an alarm is generated, the occurrence of the alarm and the degree of emergency of the alarm can be immediately known on the representing alarm indicator lamp 20. In this case, however, the meaning of the alarm can not be, practically, checked immediately because the alarm contents must be sequentially indicated on the general-purpose indicator 30 and confirmed one by one by the user. In other words, when the emergency alarm indicator lamp 21 is lit during the automatic steering, it is impossible for the user to immediately judge whether the urgent corrective operation is the switching operation from the automatic steering to the manual steering or the switching for the rudder control system because of trouble occurring in the rudder control loop. Thus, a lot of time is required until the user carries out the proper urgent operation for the alarm. This prolongs the abnormal condition during which the steering is disabled or that the steering function is lowered, thus increasing a risk in steering.

Further, if trouble occurs in the general-purpose indicator 30, the alarm content can be separately indicated, so that the content of the alarm can not be known. Accordingly, even when the urgent operation must be done immediately, such operation can not be done properly. Particularly when trouble occurs in the microcomputer 1, the alarm function itself is disabled so that during the manual steering or non-follow-up steering which should be functional regardless of the condition of the autopilot system controlled by the microcomputer 1, it becomes impossible to know an abnormality even if it occurs in the rudder control loop.

OBJECTS AND SUMMARY OF THE INVENTION

Accordingly, it is an object of this invention to provide an improved marine autopilot appararatus.

It is another object of this invention to provide a marine autopilot apparatus in which a serious abnormality for disabling the steering or lowering a steering efficiency can be removed is realized by the slightest modification of hardware.

It is still another object of this invention to provide a marine autopilot apparatus in which an emergency operation for recovering the steering function can be immediately carried out so that the marine autopilot apparratus becomes more reliable and that the safety of the steering system is increased.

It is a further object of this invention to provide a marine autopilot apparatus in which the presence or absence of an abnormality in a rudder control loop is always imdicated so that a steering risk can be minimized and hence the steering can be made more safe.

According to one aspect of the present invention, there is provided a marine autopilot comprising:

(a) microcomputer for controlling a rudder control loop formed of at least a rudder servo amplifier and a power unit for detecting an abnormality concerning at least the steering and for indicating an alarm concerning the abnormality;

(b) representing alarm indicator lamp means for classifying the occurred abnormalities into a single or plurality of groups and for classifying and collectively indicating said abnormalities in the form of a single group or a plurality of groups;

(c) general-purpose indicator means for indicating various data at least concerning the steering, set values and independent content of the abnormality; and (d) rudder control collective alarm means which is driven when at least one of a plurality of alarm points within said rudder control loop exhibits an abnormal condition so as to indicate the occurrence of any abnormality in said rudder control loop.

According to another aspect of the present invention, there is provided a marine autopilot comprising:

(a) microcomputer means for controlling a rudder control loop formed of at least a rudder servo amplidier and a power unit for detecting an abnormality concerning the steering and for indicating an alarm concerning said abnormality or the like;

(b) representing alarm indicator lamp means for classifying the occurred abnormalities into a single or plurality of groups and for collectively indicating the abnormalities in the form of the single group or of a plurality of groups;

(c) general-purpose indicator means for indicating various data at least concerning the steering, set values and an independent content of said abnormality;

(d) rudder control collective alarm means provided independently of the microcomputer means for detecting an abnormality occurred only at a plurality of alarm points within said rudder control loop; and (e) rudder control collective alarm indicator means for indicating the occurrence of an abnormality in the rudder control loop, wherein when at least one of the plurality of alarm points exhibits an abnormal condition, said rudder control collective alarm means driving said rudder control collective alarm indicator means.

These and other objects, features and advantages of the present invention will become apparent from the following detailed description of the preferred embodiment that is to be read in conjunction with the accompanying drawings, throughout which like reference numerals identify like elements and parts.

DESCRIPTION OF THE PREFERRED EMBODIMENT

Figure 1:
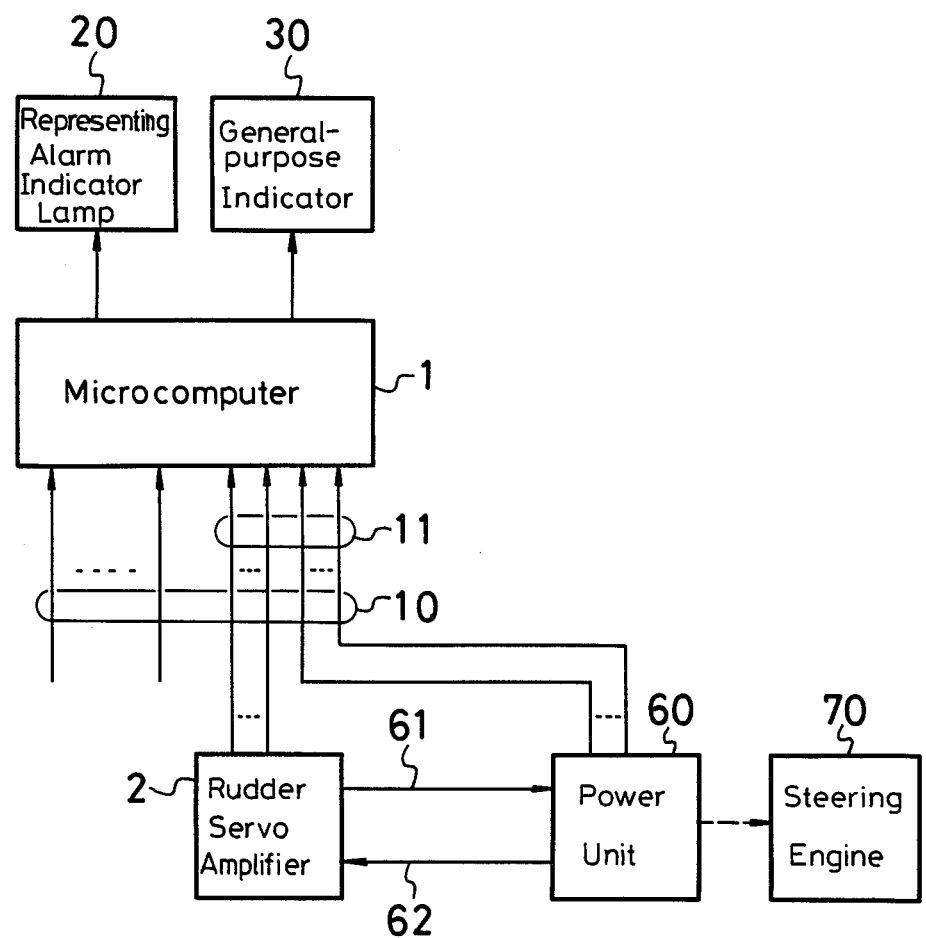
FIG. 1 is a block diagram showing example of an alarm system used in a known marine autopilot apparatus.
Figure 2:
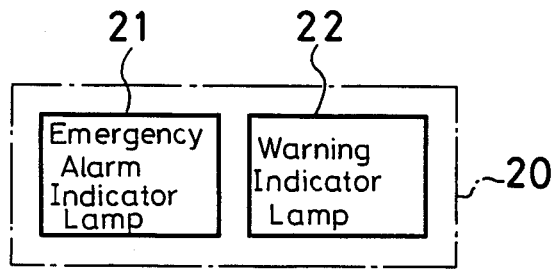
FIG. 2 is a block diagram showing another example of a representing alarm indicator lamp which is formed of two representing alarm indicator lamp sections in the known marine autopilot apparatus shown in FIG. 1.
Figure 3:
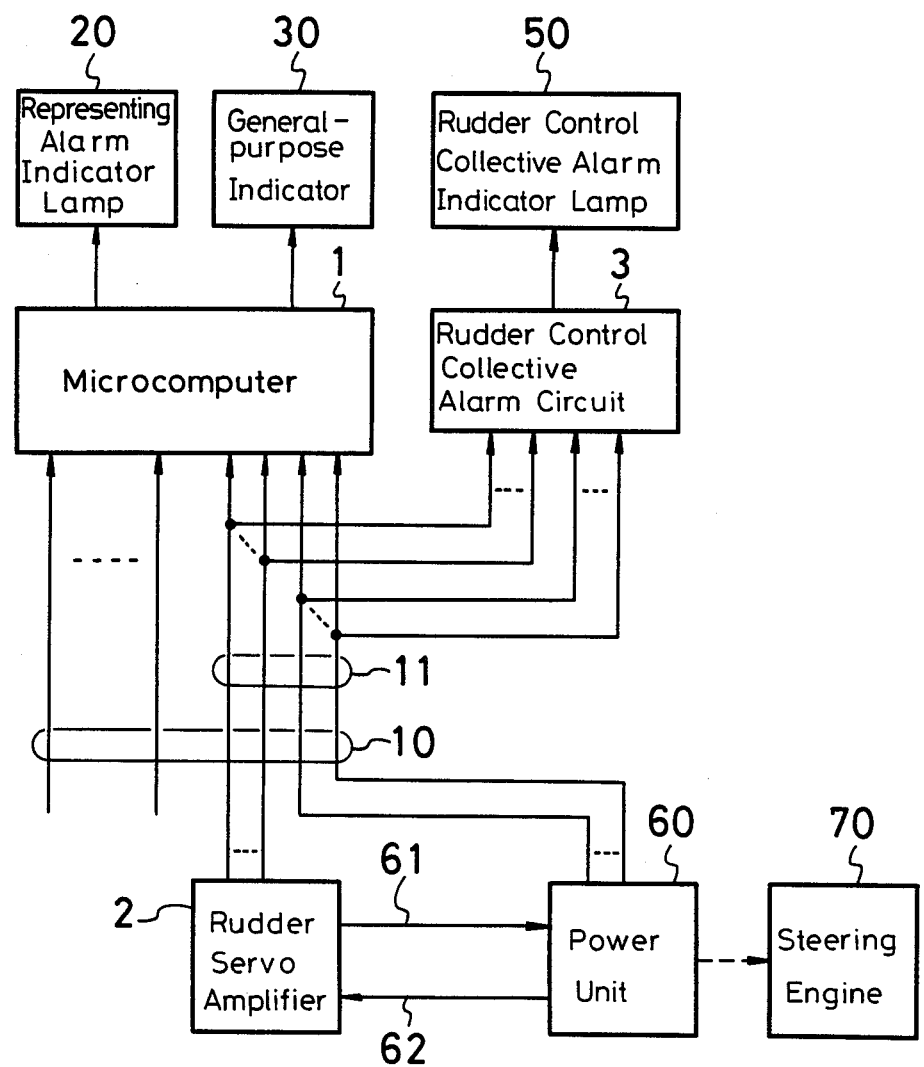
FIG. 3 is a block diagram showing an embodiment of an alarm system used in a marine autopilot apparatus according to the present invention.

An embodiment of the marine autopilot apparatus according to the present invention will hereinafter be described in detail with reference to FIG. 3. In FIG. 3, like parts corresponding to those in FIG. 1 are marked with the same reference numerals and therefore need not be further described in detail.

Referring to FIG. 3, the microcomputer 1 is adapted to carry out the alarm process of the marine autopilot. This microcomputer 1 also serves to control the steering when the ship is piloted automatically, though not shown. As earlier noted, the alarm point condition signal 10 contains a plurality of alarm point condition signals (indicated by the arrows) which are to be processed by the microcomputer 1 and which indicate the conditions of alarm points such as a power source abnormality of each of a gyro compass and a rudder servo amplifier, and other abnormalities. Each of the alarm point condition signals indicates the normal condition or abnormal condition by making itself "H" (high level) or "L" (low level) or vise versa. The rudder servo amplifier 2 and the power unit 60 constitute the servo loop through which the steering engine 70 is controlled by the power unit drive signal 61 and the follow-up signal 62. The alarm signals derived from the rudder control loop formed of the rudder servo amplifier 2 and the power unit 60 or the rudder control system alarm point condition signal 11 such as the signal showing power source abnormality of the rudder servo amplifier 2, the signal representing the lowering of the pressure of hydraulic pump (the power unit 60), etc., is a kind of the alarm point condition signal 10. These rudder control system alarm point condition signals 11 are supplied in addition to the microcomputer 1, to a rudder control collective alarm circuit 3.

The microcomputer 1 is adapted to check separately the respective signals of the alarm point condition signal 10 supplied thereto. If there exists the alarm point at which the condition signal changes from the normal condition to the abnormal condition, the microcomputer 1 judges that some abnormality occurred at the alarm point, and causes the representing alarm indicator lamp 20 to light or blink to indicate the occurrence of abnormality. Also, the microcomputer 1 causes the general-purpose indicator 30 to automatically indicate the name of the alarm point at which the abnormality occurs, etc. In this case, the general-purpose indicator 30 can generally indicate the name or the like of only one or two alarm points simultaneously, so that when alarm points more than those that can be indicated by the indicator 30 at a time occur simultaneously or during a short interval of time, the general-purpose indicator 30 will indicate only those two alarm points in the order in which the alarms are produced. Accordingly, with respect to the remaining alarm points, the contents thereof are checked by renewing and shifting the indication of the alarm points by operating, for example, a switch (not shown).

Meanwhile, the rudder control collective alarm circuit 3 is adapted to check the respective signals of the rudder control system alarm point condition signal 11 independently of the microcomputer 1. If any one of these signals becomes abnormal, the rudder control collective alarm circuit 3 allows a rudder control collective alarm indicator lamp 50 to light or blink to thereby indicate that the abnormality occurred in the rudder control lamp. If all signals of the rudder control system alarm point condition signal 11 are normal, the rudder control collective alarm circuit 3 turns off the rudder control collective alarm indicator lamp 50 to indicate that there is no abnormality in the rudder control loop.

According to the present invention, as described above, the occurrence of abnormality in the rudder control loop formed of the rudder servo amplifier 2, the power unit 60 and so on can be immediately known by the rudder control collective alarm indicator lamp 50, so that when an abnormality which is to be removed urgently occurs, the contents of the urgent operation to be carried out can be judged immediately. This can make the steering more safe.

Since the rudder control collective alarm indicator lamp 50 and the rudder control collective alarm circuit 3 are provided independently of other circuits, such as, the microcomputer 1 or the like, even if abnormality occurs in the microcomputer 1, the representing alarm indicator lamp 20 or the general-purpose indicator 30, the abnormality occurred in the rudder control loop is detected and its alarm is also indicated. As a result, the minimum alarm function in the manual steering operation or the like can be maintained, so that the alarm function of the marine autopilot apparatus can be made more reliable.

While in the above example, the present invention is applied to the case where there is provided one microcomputer system 1 for executing both the autopilot function and the alarm function, it is needless to say that the rudder control collective alarm circuit 3 and the ruder control collective alarm indicator lamp 50 may be provided for each such system where more than two systems are employed.

Further, when the microcomputer 1 is so reliable that abnormality in this microcomputer 1 is for practical purposes, out of consideration, the rudder control collective alarm circuit 3 may be omitted and the microcomputer 1 may be made to directly control the rudder control collective alarm indicator lamp 50 so as to light or blink, to indicate the occurance of abnormality in the rudder control loop.

While the rudder control loop is illustrated as being formed of the rudder servo amplifier 2 and the power unit 60 as in FIG. 3, the present invention is equally effective when the construction of the rudder control loop (containing the steering engine 70) may be such in that the steering engine 70 is directly controlled by the rudder servo amplifier 1.

According to the present invention, as set forth above, the special alarm indicator lamp which indicates the presence or absence of abnormality in the rudder control loop at all times can be realized at low cost by the slightest modification of the hardware. Further, when some serious abnormality occurs to disable the steering and to lower the steering function, the user can judge on the rudder control collective alarm indicator lamp 50 what fshould be done urgently to recover the ship's steering function and the urgent operations such as the switching from the autopiloting operation to the manual pilot operation, (if some abnormality occurs elsewhere in the rudder control loop formed of the rudder servo amplifier 2 and the power unit 60 during autopiloting); the switching from the main rudder control system to a reserve rudder control system, (if some abnormality occurs in the rudder control loop and there is provided a reserve ruder control system; and the manual steering at the side of the steering engine, (if some abnormality occurs in the rudder control loop and there is provided no reserve rudder control system) can be carried out. Thus, the marine autopilot apparatus of the invention can be made more reliable.

Furthermore, if the general-purpose indicator 30 and the microcomputer 1 become out of order, the contents of separate alarms can not be known or the alarms themselves are lost in the prior art. However, according to the present invention, since the presence or absence of the abnormality in the rudder control collective alarm circuit 3 and the rudder control collective alarm indicator lamp 50 which are provided independently of the microcomputer 1, a risk in steering the ship is minimized and the steering is made more safe.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. A marine autopilot apparatus comprising:
   (a) microcomputer means for controlling a rudder control loop formed of at least a rudder servo amplifier and a power unit including means for detecting an abnormality at any one of a plurality of alarm points within said rudder control loop, and means for detecting various abnormalities at a plurality of alarm points other than said plurality of alarm points within said rudder control loop and for providing signals indicative of the respective abnormality;
   (b) representing alarm indicator lamp means responsive to said signals for classifying all of the occurring abnormalities into a single or plurality of groups in accordance with the degree of emergency thereof and for collectively indicating said abnormalities in the form of said single or plurality of groups;
   (c) general-purpose indicator means responsive to said signals for sequentially indicating various data at least concerning the steering, set values and an independent content of said abnormality; and
   (d) rudder control collective alarm indicator means responsive to the plurality of alarm points only within said rudder control loop and driven when at least one of said plurality of alarm points only within said rudder control loop evidences an abnormal condition so as to provide an alarm indicating the occurrence of an abnormality in said rudder control loop independently of the representing alarm indicator means.

2. A marine autopilot apparatus comprising:
(a) microcomputer means for controlling a rudder control loop formed of at least a rudder servo amplifier, and a power unit including means for detecting an abnormality at least one of a plurality of alarm points within said rudder control loop and means for detecting various abnormalities at a plurality of alarm points other than said plurality of alarm points within said rudder control loop providing a signal indicative of the respective abnormality;
(b) representing alarm indicator lamp means responsive to said signals for classifying all of the occurring abnormalities into a single or plurality of groups in accordance with the degree of emergency thereof and for collectively indicating said abnormalities in the form of said single or plurality of groups;
(c) general-purpose indicator means responsive to said signal for sequentially indicating various data at least concerning the steering, set values and an independent content of said abnormality;
(d) rudder control collective alarm means for detecting independently of said microcomputer an abnormality occurring at one or more alarm points only within said rudder control loop; and
(e) rudder control collective alarm indicator means responsive to said rudder control collective alarm means for indicating the occurrence of an abnormality only in said rudder control loop, wherein when at least one of said plurality of alarm points in said rudder control loop evidences an abnormal condition, said rudder control collective alarm means drives said rudder control collective alarm indicator means to indicate the occurrance of an abnormality independently of the representing alarm indicator means.

* * * * *